(12) United States Patent
Bianco

(10) Patent No.: US 6,359,786 B1
(45) Date of Patent: Mar. 19, 2002

(54) COMMUNICATION TERMINAL WITH MULTICONFIGURABLE FUNCTION MODULES

(76) Inventor: James S. Bianco, 217 Brainard Rd., Enfield, CT (US) 06082

( * ) Notice: Subject to any disclaimer, the term of this patent is extended or adjusted under 35 U.S.C. 154(b) by 0 days.

(21) Appl. No.: 09/088,406

(22) Filed: Jun. 1, 1998

(51) Int. Cl.[7] .............................. H05K 5/00; H05K 7/02
(52) U.S. Cl. ....................... 361/730; 361/686; 361/733; 361/810; 708/105; 708/109
(58) Field of Search .................... 361/683, 684, 361/686, 730, 731–733, 807, 809, 810, 814, 823; 439/928, 928.1; 708/100, 105, 109

(56) References Cited

U.S. PATENT DOCUMENTS

| | | | | |
|---|---|---|---|---|
| 4,894,792 A | * | 1/1990 | Mitchell et al. ............ | 361/684 |
| 5,058,045 A | * | 10/1991 | Ma .............................. | 361/683 |
| 5,065,141 A | * | 11/1991 | Whitsitt ...................... | 361/686 |
| 5,126,954 A | * | 6/1992 | Morita ......................... | 361/683 |
| 5,251,105 A | * | 10/1993 | Kobayashi et al. ......... | 361/683 |
| 5,608,607 A | * | 3/1997 | Dittmer ....................... | 361/686 |
| 5,748,443 A | * | 5/1998 | Flint et al. .................. | 361/686 |
| 5,761,033 A | * | 6/1998 | Wilhelm ...................... | 361/686 |
| 5,774,331 A | * | 6/1998 | Sach ........................... | 361/683 |
| 5,805,416 A | * | 9/1998 | Friend et al. ............... | 361/686 |
| 5,864,481 A | * | 1/1999 | Gross et al. ................ | 361/683 |
| 5,978,821 A | * | 11/1999 | Freeny ........................ | 361/686 |
| 6,049,813 A | * | 4/2000 | Danielson et al. .......... | 361/683 |
| 6,052,279 A | * | 4/2000 | Friend et al. ............... | 361/686 |
| 6,076,124 A | * | 6/2000 | Korowitz et al. ........... | 361/686 |
| 6,122,161 A | * | 9/2000 | Gierut ......................... | 361/683 |

* cited by examiner

*Primary Examiner*—Jeffrey Gaffin
*Assistant Examiner*—John B. Vigushin
(74) *Attorney, Agent, or Firm*—John H. Crozier

(57) ABSTRACT

In a preferred embodiment, a multiconfigurable communication terminal, including: a terminal housing; electronic circuitry disposed within the housing; at least one selected functional electronic module removably disposed in the housing and releasably attached to the electronic circuitry.

11 Claims, 10 Drawing Sheets

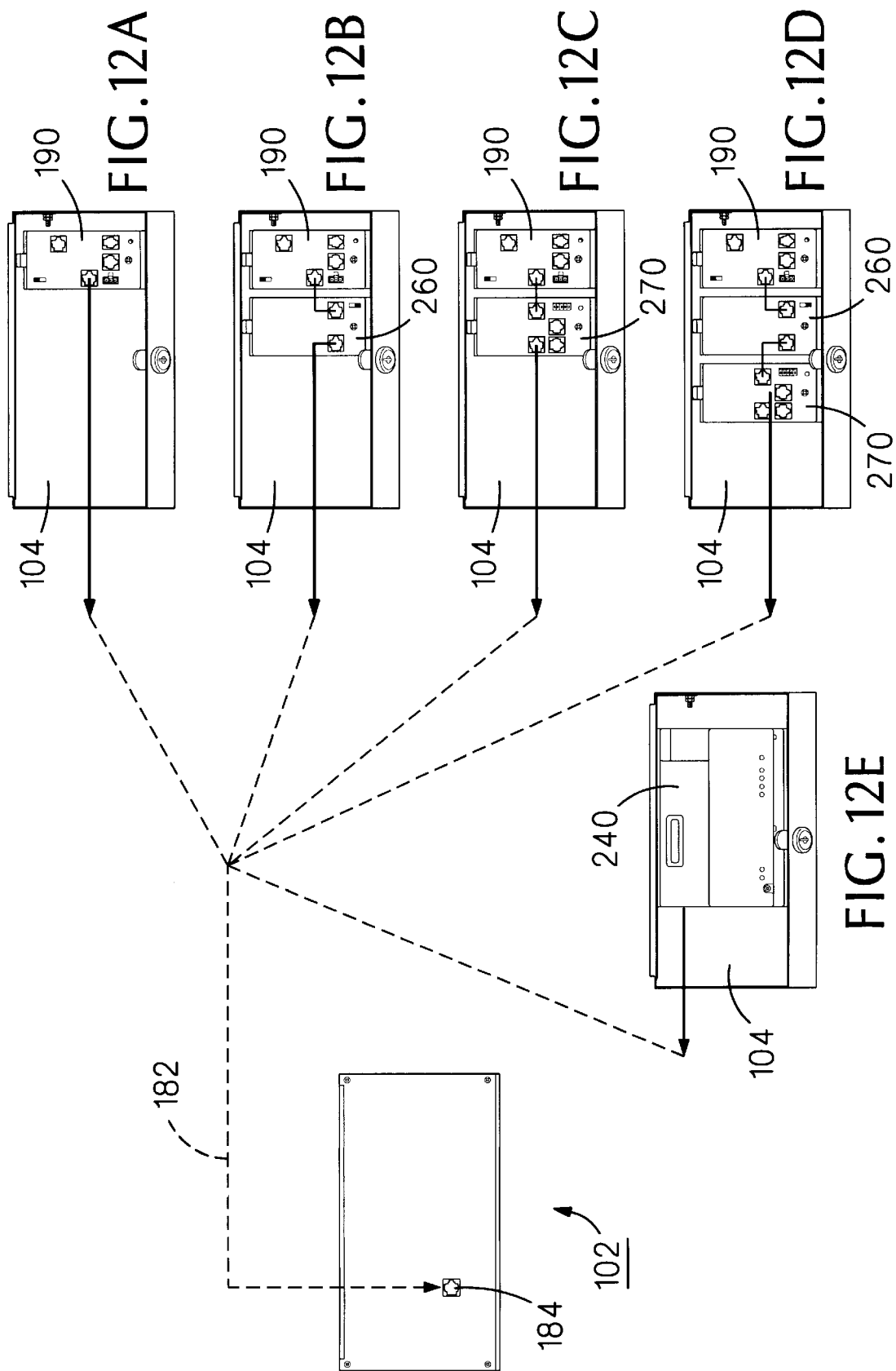

COMMUNICATION TERMINAL WITH MULTICONFIGURABLE FUNCTION MODULES

BACKGROUND OF THE INVENTION

1. Field of the Invention

The present invention relates to communication devices generally and, more particularly, but not by way of limitation, to a novel communication terminal which can be configured or reconfigured in the field to provide a variety of functions.

2. Background Art

Communication terminals are widely used to input information to and/or to receive information from other communication devices and/or host computers for such applications, for example, as controlled access and facilities monitoring, interfacing to wands/scanners and identification printers/machine controllers, personnel identification, and networking with other such terminals. Such communication terminals are typically designed and manufactured to perform a specific function or to be programmable within defined limits. Consequently, manufacturers, integrators, and/or resellers have to inventory a range of completed instruments or have to have trained technical personnel available to program or custom design the terminals.

Accordingly, it is a principal object of the present invention to provide a multiconfigurable communication terminal which can be configured or reconfigured without the need for trained personnel or special tools.

It is a further object of the invention to provide such a multiconfigurable communication terminal which can be configured or reconfigured in the field.

It is an additional object of the invention to provide such a multiconfigurable communication terminal is economically manufactured and easily used.

It is another object of the invention to provide such a multiconfigurable communication terminal which can be configured or reconfigured in the field to accommodate changes or advances in technology.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a multiconfigurable communication terminal, comprising: a terminal housing; electronic circuitry disposed within said housing; at least one selected functional electronic module removably disposed in said housing and releasably attached to said electronic circuitry.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIGS. 12A–E are top plan views of various configurations of functional modules in the terminal of FIG. 1.

DETAILED DESCRIPTION OF THE PREFERRED EMBODIMENTS

Figure 1:
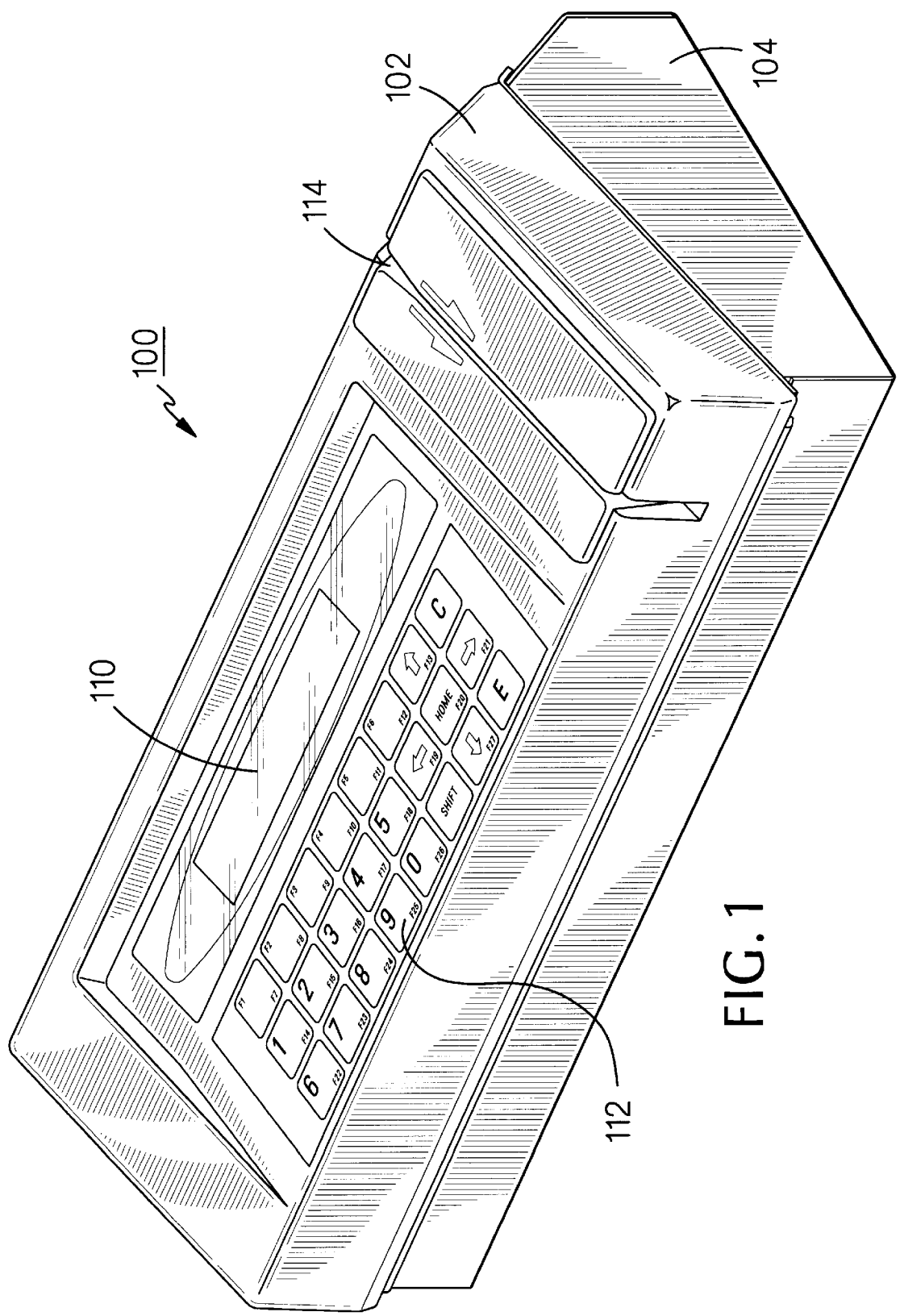
FIG. 1 is an isometric view of a communication terminal including the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a communication terminal, constructed according to the present invention, and generally indicated by the reference numeral 100. Terminal 100 includes an upper housing 102 and a lower housing 104 joined by locking means (not shown on FIG. 1). Upper housing includes on the upper surface thereof an LCD display 110, an alphanumeric keypad 112, and a slot reader 114 which may be of the type to read a magnetic stripe and/or optical indicia on an identification card. Other conventional input and/or output elements may be provided in association with upper housing 102 instead of, or in addition to, those shown, or, for example, an element such as slot reader 114 may be omitted. Lower housing 104 contains one or more insertable modules as are described below. Upper housing 102 contains (not shown) electronic circuitry and memory elements for receiving inputs, providing outputs, and performing calculations in connection with the elements on the upper housing and to support the modules in lower housing 104.

Upper housing 102 and lower housing 104 are shown configured in a desk-top-mount arrangement, with the upper surface of the upper housing sloping downwardly toward a user. Lower housing 104 may be rotated 180 degrees from its position shown on FIG. 1 to configure terminal 100 in a wall-mount arrangement. Suitable access and mounting openings (not shown) are provided in lower housing 104 for either type of mounting.

Figure 2:
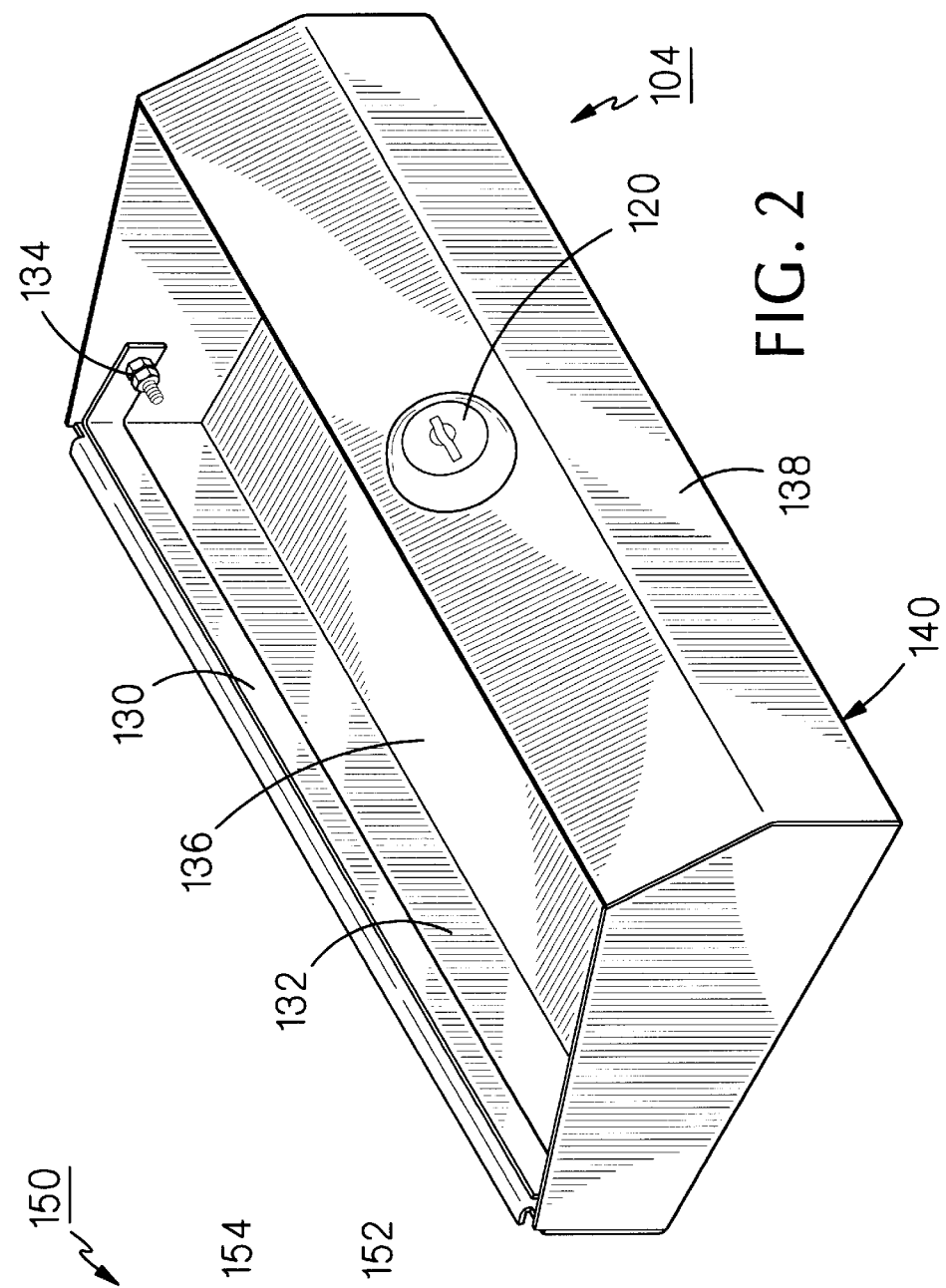
FIG. 2 is an isometric view of the lower housing of the terminal of FIG. 1.

FIG. 2 illustrates lower housing 104 and shows a conventional cylinder lock 120 which secures upper housing (FIG. 1) to the lower housing when the lock is in its locked position. Lower housing 104 includes a grounding bus 130 running along a rear wall 132 and having a grounding terminal 134 disposed at one end thereof for attachment to a suitable earth ground. It will be noted that a bottom wall 136 and a front wall 138 of lower housing meet at an angle of about 90 degrees at 140.

Figure 3:
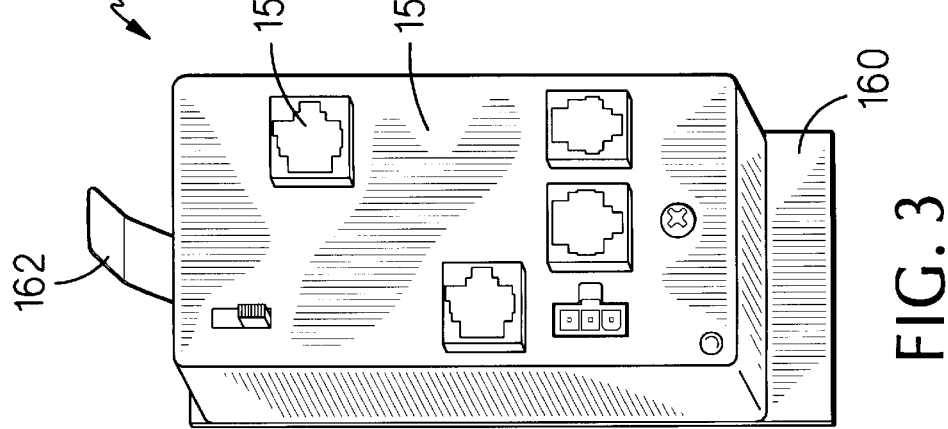
FIG. 3 is an isometric view of a functional module for insertion in the lower housing of FIG. 2.

Referring also to FIG. 3, there is illustrated a typical electronic module, generally indicated by the reference numeral 150. Module 150 includes a housing 152 containing electronic circuitry suitable for the purpose of the module and has a plurality of connector ports, as at 154. A flat plate 160 forming the base of module 150 extends outwardly from the lower edge of the module, while a grounded spring clip 162 extends from the upper side of the housing.

Figure 4:
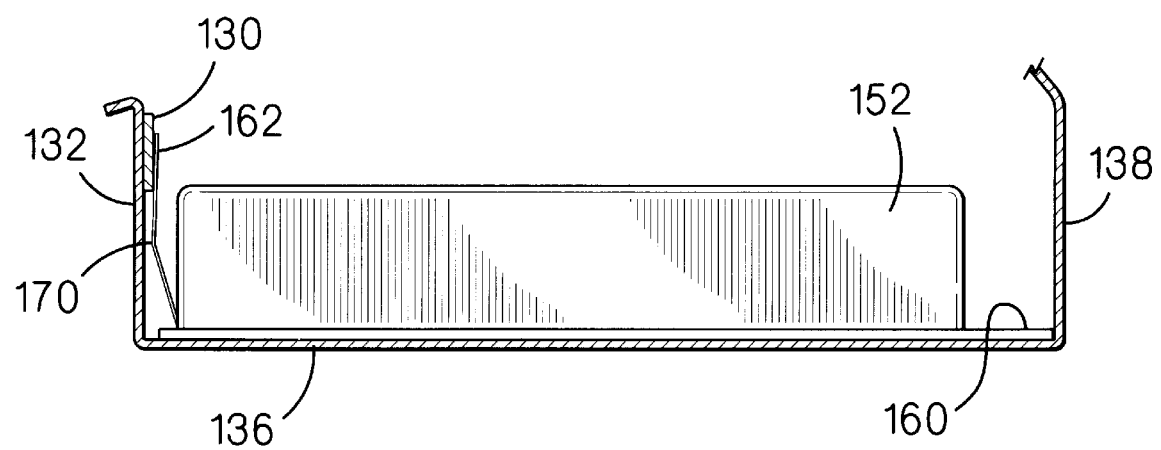
FIG. 4 is a fragmentary, side elevational view of the module of FIG. 3 mounted in the lower housing of FIG. 2.

Module 150 (FIG. 3) is inserted in lower housing 104 (FIG. 2) by placing the edge of plate 160 against the internal angle formed by the intersection of bottom wall 136 and front wall 138 at 140, then rotating the module so that flat plate 160 is against bottom wall 136 and grounded spring clip 162 is in contact with grounding bus 130 and is compressed by the grounding bus, thus "snapping" the module in place into a releasably secure position in the lower housing. FIG. 4 illustrates in detail the compression of grounding spring clip 162 by grounding bus 130 and shows that the lower edge of the grounding bus intersects the grounding spring clip above an angle 170 formed in the latter, thus increasing the resistance against upward movement of module 150. Other modules may be similarly inserted in lower housing 104 as required.

Figure 5:
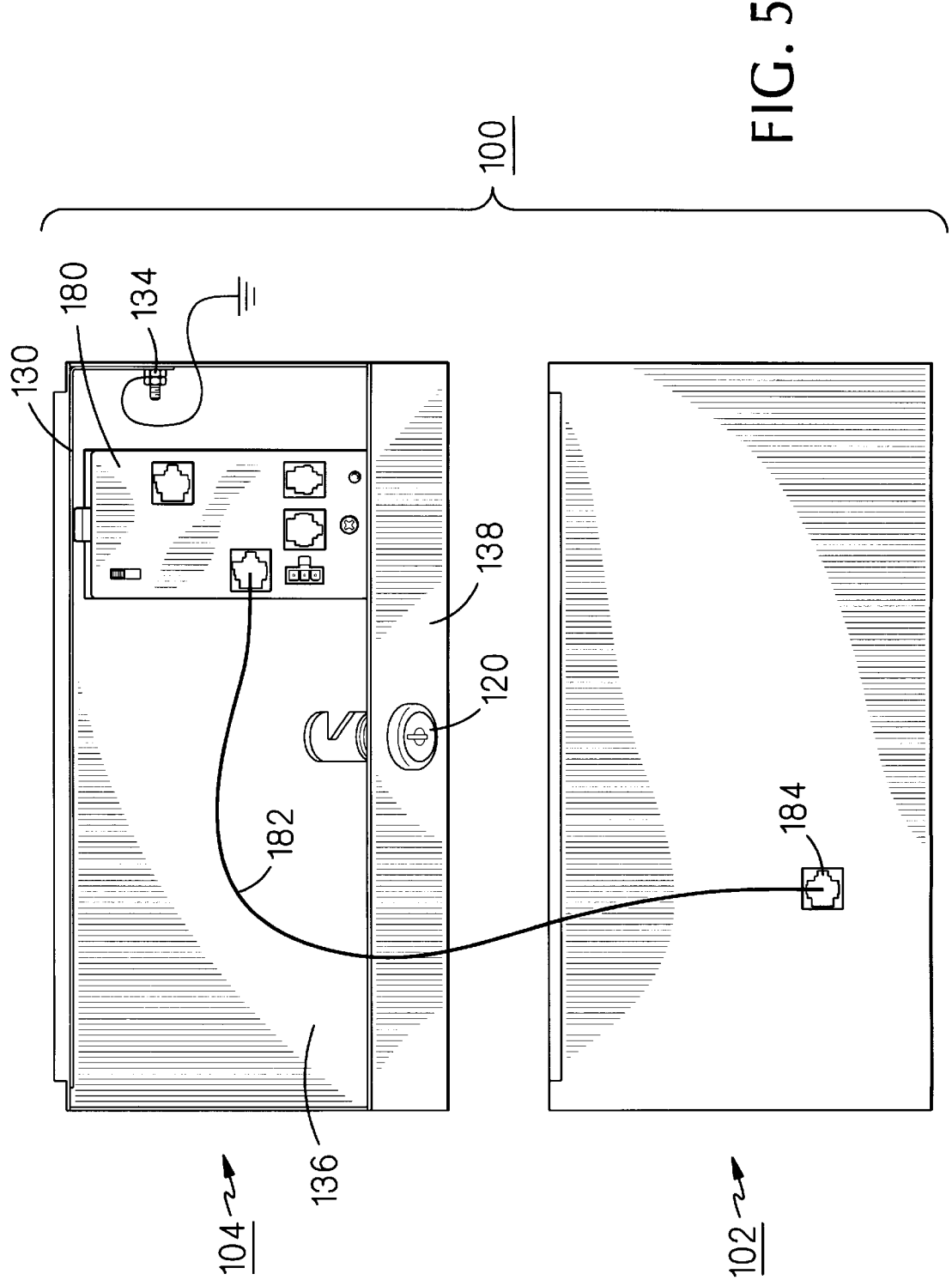
FIG. 5 is a plan view showing the interconnection of of the upper housing of the terminal of FIG. 1 with a module disposed in the lower housing.

FIG. 5 illustrates some basic connections for terminal 100 and shows a communications module 180 inserted in lower housing 104. Grounding terminal 134 has been connected to earth ground and a conventional flexible cable 182 extends from communications module 180 to a suitable port 184 on the rear surface of upper housing 102.

Figure 6:
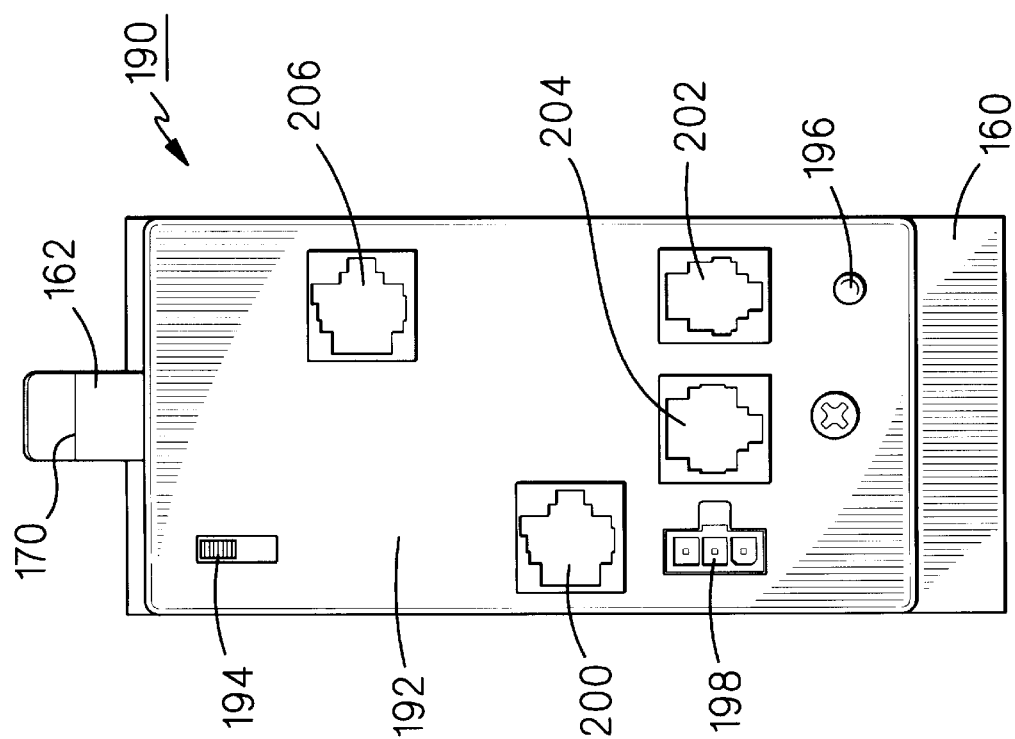
FIG. 6 is a top plan view of one embodiment of a communications module for use in the terminal of FIG. 1.

FIG. 6 illustrates a communications module, generally indicated by the reference numeral 190 and having a housing 192. Module 190 also has a flat plate 160 and a grounding spring clip 162 as described above (FIG. 3). Module 190 includes in housing 192 a test/use switch 194 for setup and diagnostics, an LED indicator 196 for diagnostics, and a port 198 for furnishing power to the module from a conventional DC power pack. Also included are port 200 for furnishing filtered voltage to and TLL level communication with upper housing 102 (FIG. 1) and/or another module, port 202 for RS232 or RS485 bi-directional communications with a host computer (not shown), port 204 for RS485 communications with additional terminals, and a port 206 for communications with a reading device such as slot reader 114 (FIG. 1). Power to module 190 can be provided by three different sources: (1) via port 198, via host port 202, or via port 200 from an internal uninterruptible power supply module which provides battery power in the event one of the main power sources fails. It will be understood that one or more of ports 198, 202, 204, and 206 may be omitted depending on the application, or additional ports may be provided.

Figure 7:
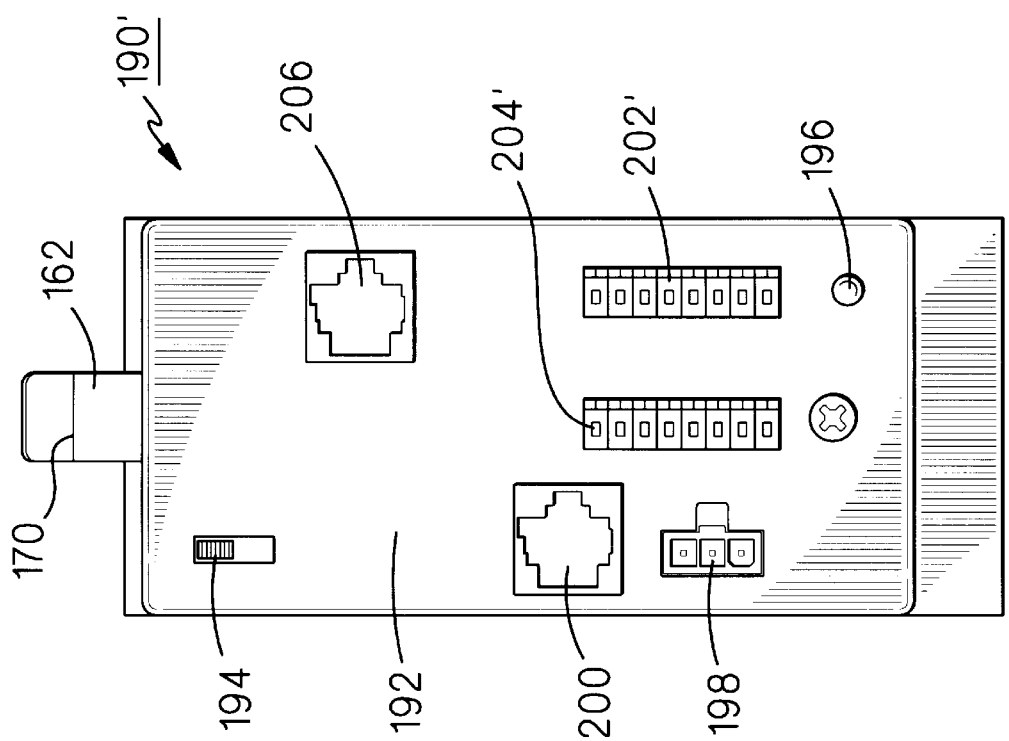
FIG. 7 is a top plan view of another embodiment of a communications module for use in the terminal of FIG. 1.

FIG. 7 illustrates a variation of module 190 (FIG. 6), generally indicated by the reference numeral 190'. Here, ports 202 and 204 have been replaced, respectively, by punch down termination connectors 202' and 204', with the functions of the module and the ports remaining unchanged.

Figure 8:
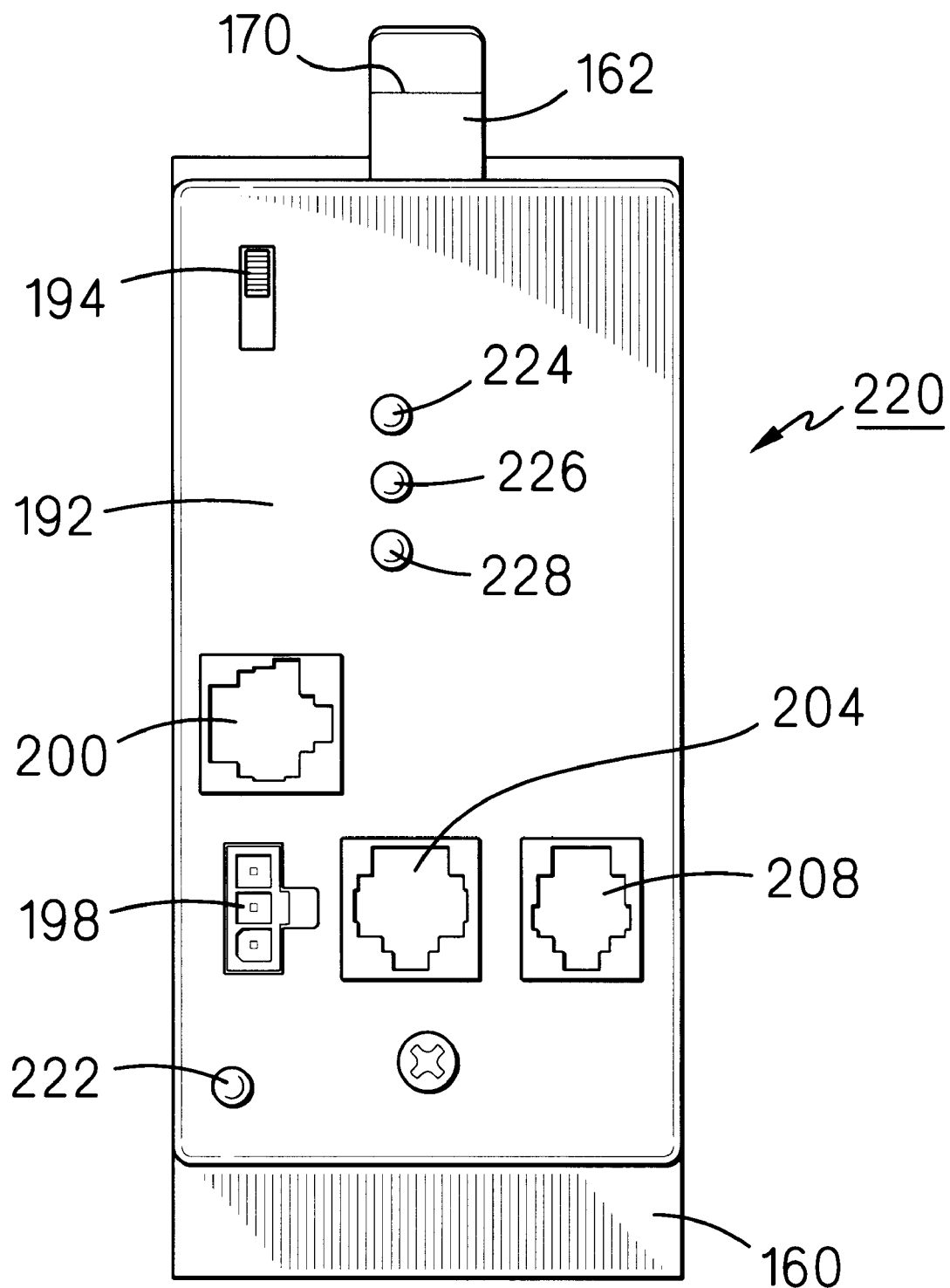
FIG. 8 is a top plan view of a communications converter module for use in the terminal of FIG. 1.

FIG. 8 illustrates a communications converter module, generally indicated by the reference numeral 220 which contains an auto answer/auto connect modem to a host computer through a telephone port 208. Module 220 also includes a power indicating LED 222, and status indicating LEDs 224, 226, 228, the latter LEDs indicating, respectively, "carrier detected", "transmitting data", and "receiving data".

Figure 9A:
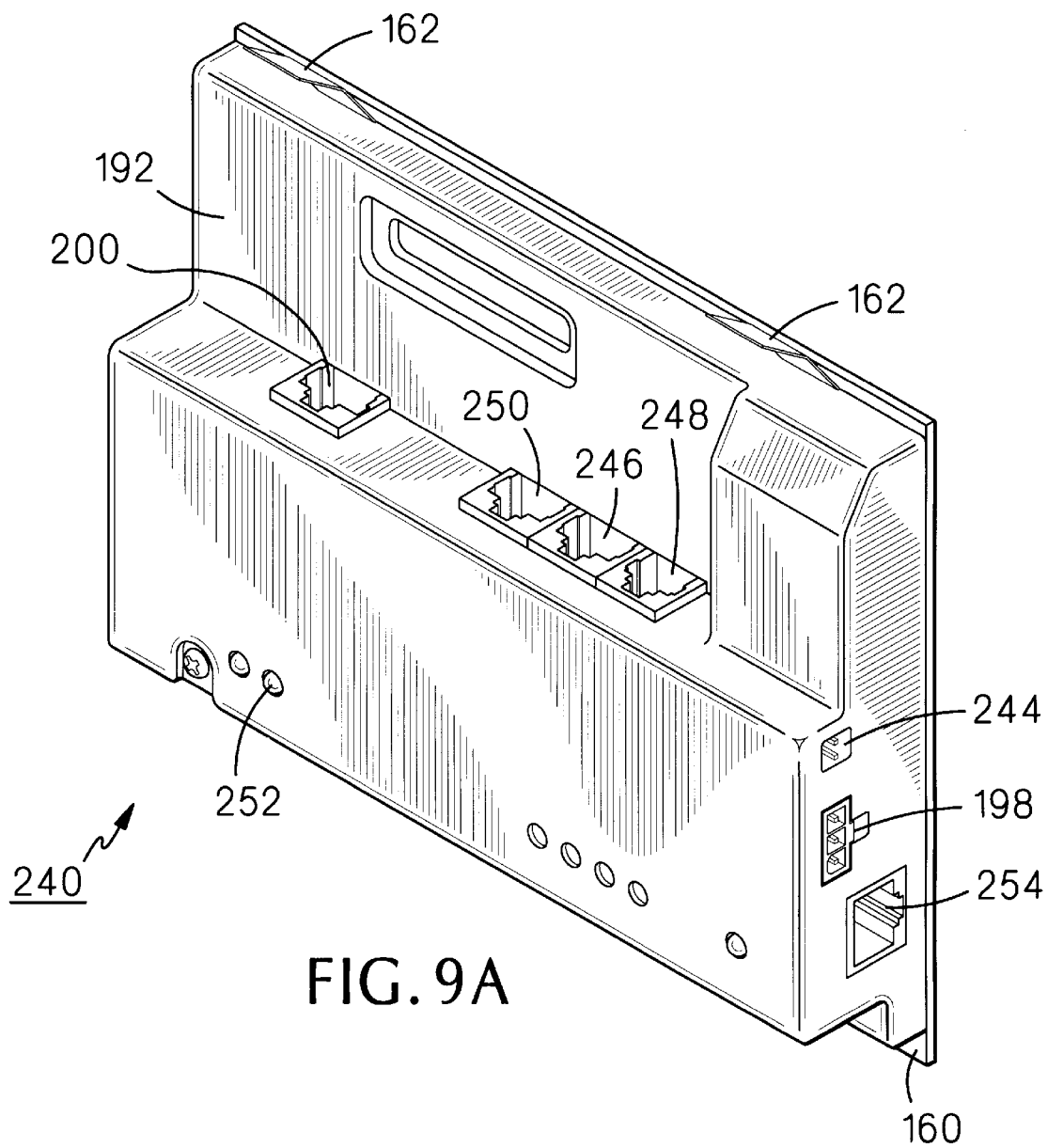
FIGS. 9A and 9B are isometric views of a local area network (LAN) communications module for use in the terminal of FIG. 1.
Figure 9B:
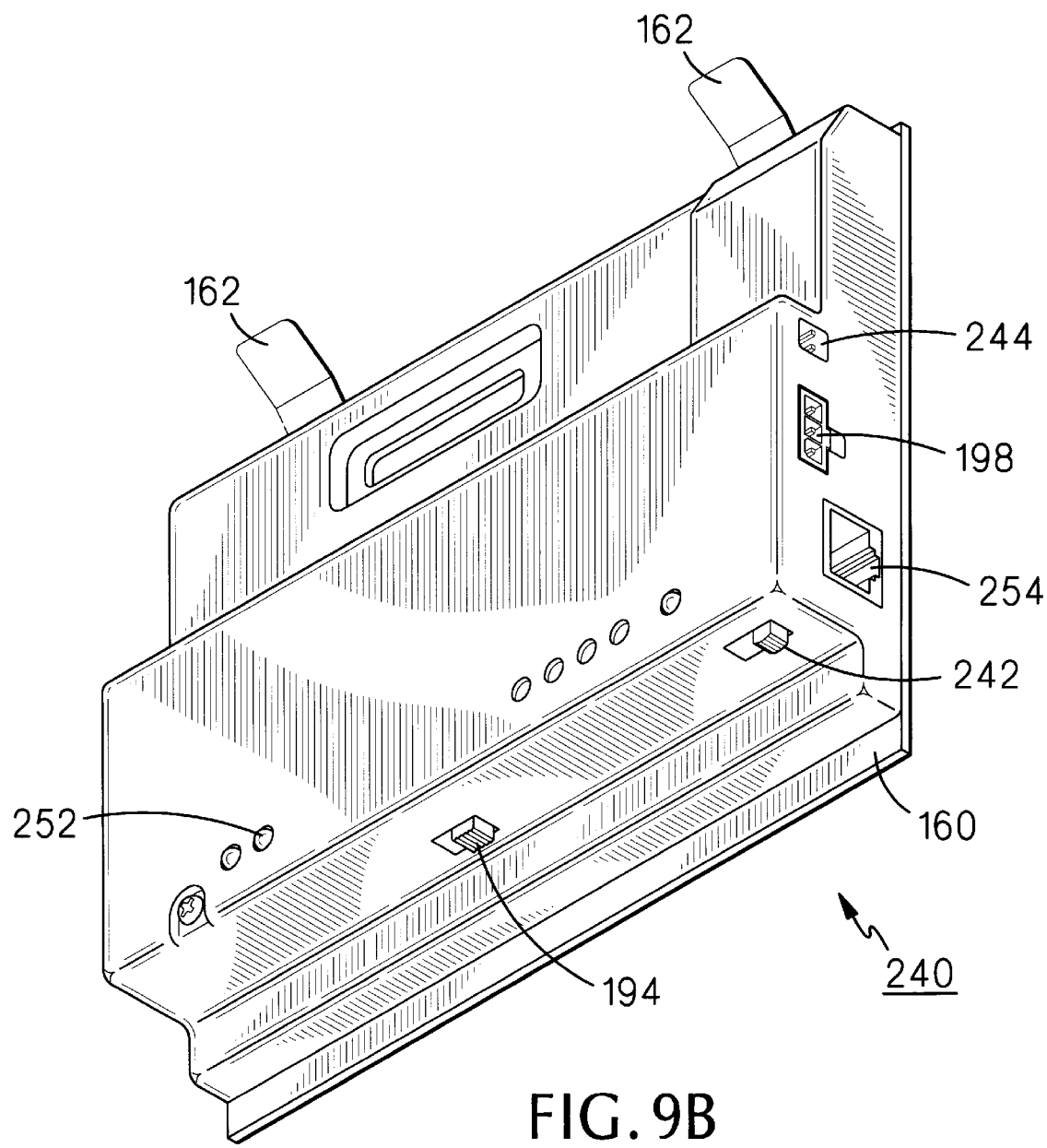

FIGS. 9A and 9B together illustrate an ethernet communications module, generally indicated by the reference numeral 240. Module 240 includes, in addition to elements previously described above, a power on/off switch 242, a power out port 244 to power an external device such as a media converter (not shown), a port 246 for connection to a host computer or one or more other terminals over a local area network (LAN) via TCP/IP, a port 248 for connection to an external reading device such as a bar code reading wand, a data in/data out (DI/DO) port 250, and a token ring UTP connection 254. The media converter would typically convert token ring UTP connection 254 to a fiber optic connection. Note that module 240 is twice as wide as modules 190, 190', and 220 and has two grounding spring clips 162. Module 240 also includes a plurality of LEDs, as at 252, to indicate status.

Figure 10:
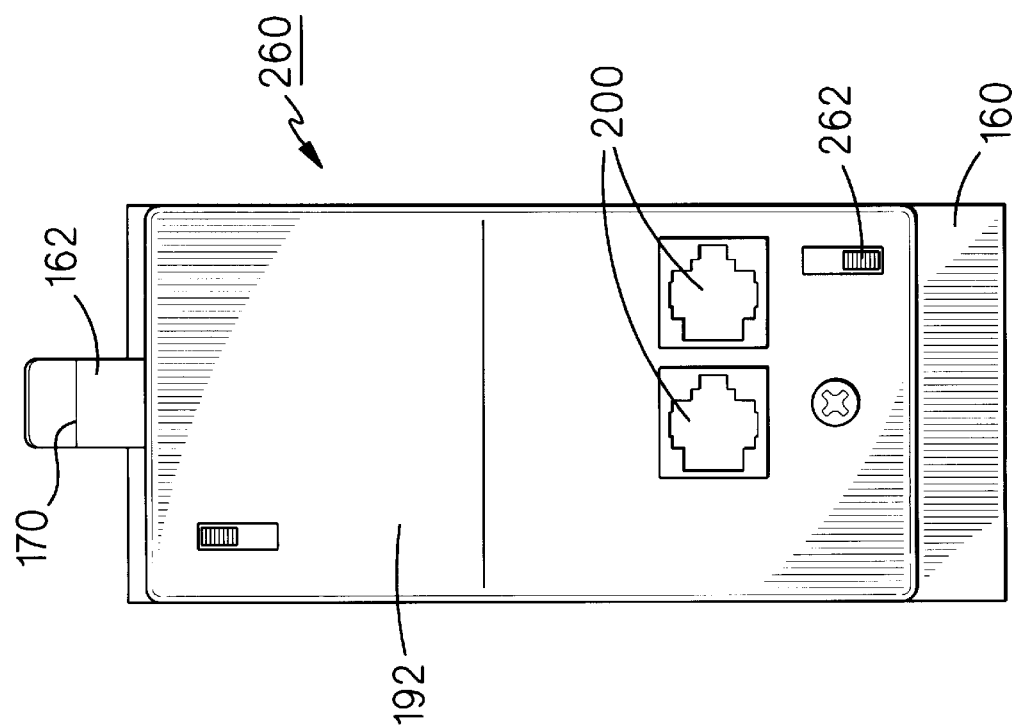
FIG. 10 is a top plan view of an uninterruptible power supply module for use in the terminal of FIG. 1.

FIG. 10 illustrates an uninterruptible power supply (UPS) module, generally indicated by the reference numeral 260. Module 260 includes an on/off switch 262 and includes a battery (not shown) to provide power to other modules and to upper housing 102 (FIG. 1) directly or through another module, in the event of a failure of the main power supply. Module 260 includes an automatic low battery power disconnect (not shown). Only two ports 200 are included in module 260, since the module will be connected only to other modules or to upper housing 102.

Figure 11:
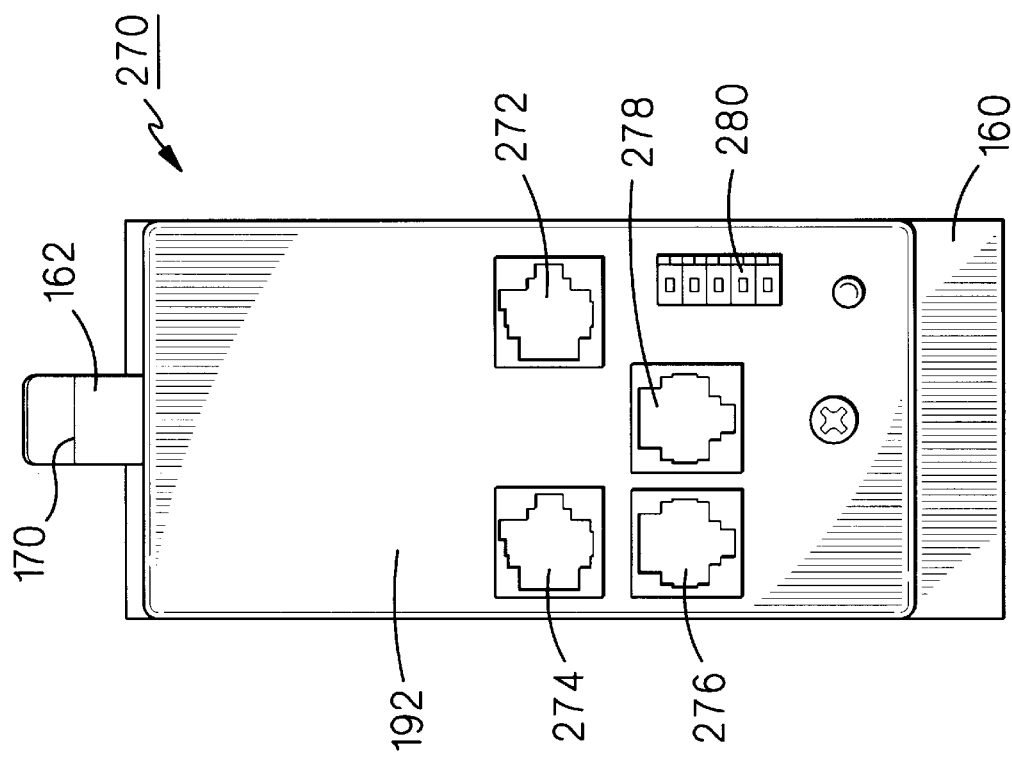
FIG. 11 is a top plan view of an auxiliary control module for use in the terminal of FIG. 1.

FIG. 11 illustrates an auxiliary control module, generally indicated by the reference numeral 270. Module 270 includes, in addition to elements described above, port 272 is provided for receiving power from and receiving and/or sending communications to or from a UPS or a communications module, port 274 is provided for sending power to and receiving and/or sending communications to or from upper housing 102 (FIG. 1), port 276 is provided for receiving digital data from compatible external devices such as wands, CCD scanners, and slot readers, port 278 is provided for auxiliary input and output support, and port 280 is a punch down DI/DO connector.

FIGS. 12A–E illustrate various configurations possible with some of the modules described above. On FIG. 12A, only communications module 190 is provided in lower housing 104. On FIG. 12B, UPS module 260 is included with communications module 190. On FIG. 12C, communications module 190 and auxiliary control module 270 are provided. On FIG. 12D, all three modules 190, 260, and 270 are included. On FIG. 12E, LAN communications module 240 is provided. In all cases, the power and communications connections have been omitted. The modules are interconnected with conventional flexible cables.

It will be understood that the modules described above can be removed and/or inserted in the field by semi-skilled personnel without the use of tools and without the necessity for reprogramming any of the components. Thus, the function of a particular terminal may be easily and economically changed in the field by simply adding or replacing the functional modules in the terminal.

An important aspect of the present invention is that future changes or advancements in the field can be accommodated in a terminal by adding a new module to the terminal or by replacing an existing module with the new module. Again, no tools, reprogramming, or skilled personnel would be required to make the upgrade.

In the embodiments of the present invention described above, it will be recognized that individual elements and/or features thereof are not necessarily limited to a particular embodiment but, where applicable, are interchangeable and can be used in any selected embodiment even though such may not be specifically shown.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A multiconfigurable communication terminal, comprising:
   (a) a terminal housing;
   (b) electronic circuitry disposed within said housing; and
   (c) at least two selected functional electronic modules removably disposed in said housing and releasably attached to each other and to said electronic circuitry.

2. A multiconfigurable communication terminal, as defined in claim 1, wherein said at least two selected functional electronic modules are selected from the group consisting of: a communications module, a communications converter module, a LAN module, an uninterruptible power supply module, and an auxiliary control module.

3. A multiconfigurable communication terminal, as defined in claim 1, wherein: one of said at least two selected functional electronic modules has a port for connection to one other said at least two selected functional electronic modules.

4. A multiconfigurable communication terminal, comprising:
   (a) a terminal housing having therein at least one selected functional electronic module; said at least one selected functional electronic module including:
   (b) a module housing;
   (c) a plate extending from a first end of said module housing;
   (d) a spring clip extending from a second, opposite end of said module housing; and
   (e) said at least one selected functional electronic module is adapted to be removably mounted in said terminal housing by placing a distal end of said plate against an inside surface of said terminal housing and rotatingly inserting said at least one selected functional electronic module into said terminal housing, so as to compress said spring clip against a member of said terminal housing.

5. A multiconfigurable communication terminal, as defined in claim 4, wherein: said spring clip comprises an electrical grounding member for said at least one selected functional electronic module and said member of said terminal housing comprises an electrical grounding bus.

6. A method of configuring and reconfiguring a multiconfigurable communication terminal, comprising:
   (a) providing a terminal housing;
   (b) providing electronic circuitry disposed within said housing;
   (c) removably inserting at least two selected functional electronic modules in said housing and releasably attaching said at least two selected functional electronic modules to each other and to said electronic circuitry.

7. A method of configuring and reconfiguring a multiconfigurable communication terminal, as defined in claim 6, further comprising, selecting said at least two selected functional electronic modules from the group consisting of: a communications module, a communications converter module, a LAN module, an uninterruptible power supply module, and an auxiliary control module.

8. A method of configuring and reconfiguring a multiconfigurable communication terminal, as defined in claim 6, further comprising: providing one of said at least two selected functional electronic modules with a port for connection to one other of said at least two selected functional electronic modules.

9. A method of configuring and reconfiguring a multiconfigurable communication terminal, comprising:
   (a) providing a terminal housing having therein at least one selected functional electronic module;
   (b) providing said at least one selected functional electronic module including a module housing, a plate extending from a first end of said module housing, and a spring clip extending from a second, opposite end of said module housing; and
   (c) removably mounting said at least one selected functional module in said terminal housing by placing a distal end of said plate against an inside surface of said terminal housing and rotatingly inserting said electronic module into said terminal housing, so as to compress said spring clip against a member of said terminal housing.

10. A method of configuring and reconfiguring a multiconfigurable communication terminal, as defined in claim 9, further comprising: providing said spring clip as an electrical grounding member for said at least one selected functional electronic module and providing said member of said terminal housing as an electrical grounding bus.

11. A method of configuring and reconfiguring a multiconfigurable communication terminal, as defined in claim 9, further comprising: removing said at least one selected functional electronic module from said terminal housing and inserting at least one other said at least one selected functional electronic module in said terminal housing.

* * * * *